(No Model.)
P. R. & M. F. X. FOLEY.
STREET CAR FENDER.
No. 542,047. Patented July 2, 1895.
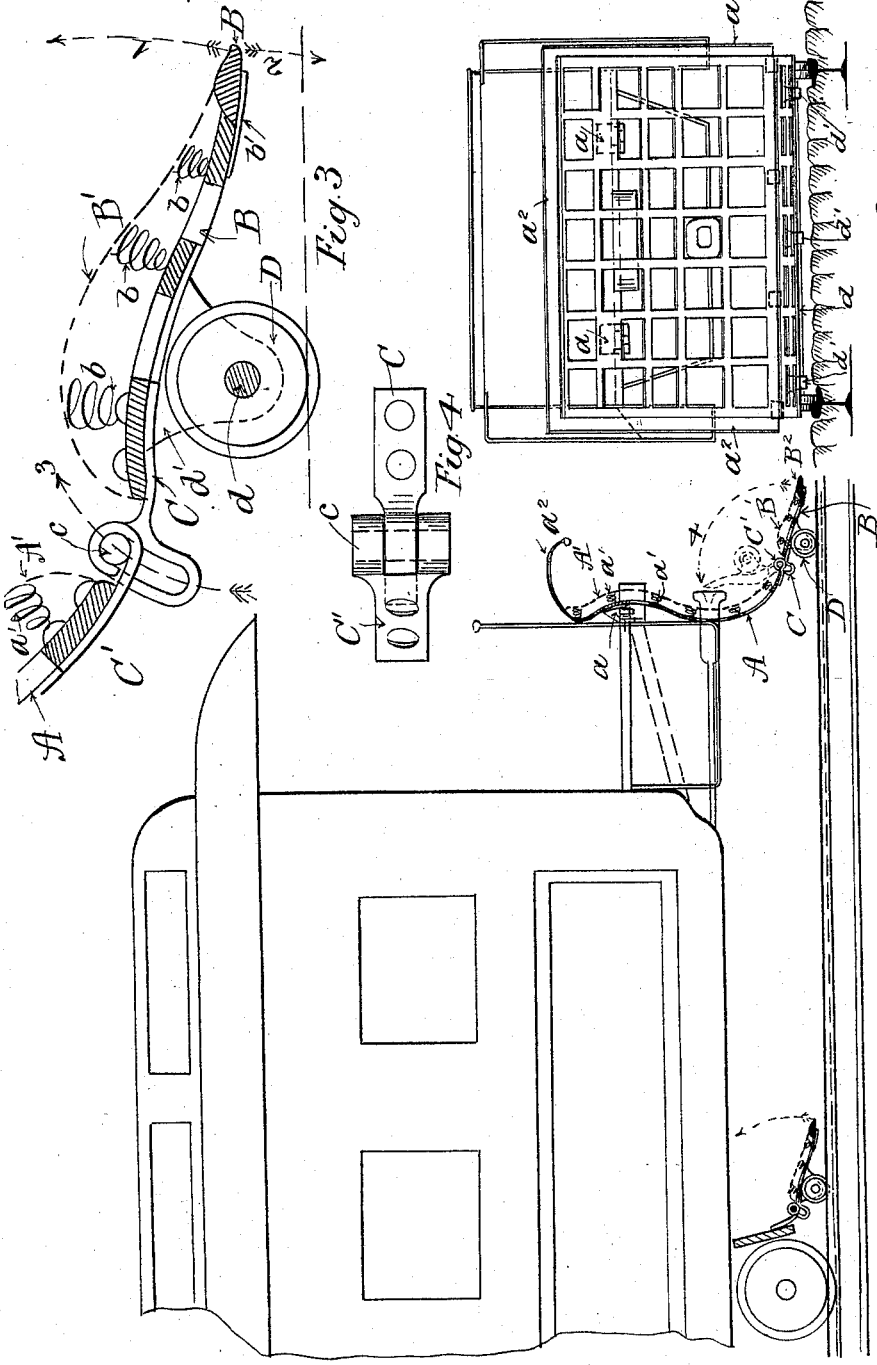
WITNESSES:
INVENTORS

UNITED STATES PATENT OFFICE.

PETER R. FOLEY AND MICHAEL F. X. FOLEY, OF PHILADELPHIA, PENNSYLVANIA.

STREET-CAR FENDER.

SPECIFICATION forming part of Letters Patent No. 542,047, dated July 2, 1895.

Application filed October 23, 1894. Serial No. 526,713. (No model.)

*To all whom it may concern:*

Be it known that we, PETER R. FOLEY and MICHAEL F. X. FOLEY, citizens of the United States, residing at Philadelphia, in the county of Philadelphia and State of Pennsylvania, have invented certain new and useful Improvements in Street-Car Fenders; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to guards or fenders to be attached to the forward parts of trolley and cable street-railway cars; and the object of our improvement is to provide a safe and efficient guard or fender that will prevent either a child or grown-up person from being run over by the moving car.

We accomplish the desired result by constructing and arranging the several parts of the fender in the manner hereinafter described, and particularly pointed out in the claims.

In the accompanying drawings, Figure 1 is a side elevation of the front portion of a car having our improved fender attached thereto. Fig. 2 is an end elevation of the car and the framework only of the fender attached thereto. Figs. 3 and 4 are enlarged details showing the construction of the forward part of the fender or what we term the "apron."

A represents the open framework of the fender. This part may be constructed of wood or of light strips of steel secured together in the manner shown in Fig. 2.

$a\ a$ are two stout iron hooks on the back of the frame A. These hooks fit into corresponding openings on the dasher of the car and hold the fender in position. A' is a strong wire-netting covering the frame A.

$a'\ a'\ a'$ are coiled-wire springs secured to the frame A underneath the wire-netting A' and attached thereto.

$a^2$ is an extension formed around three sides of the frame A. This extension will act as a guard and prevent anything from being thrown against the dasher or under the steps of the car.

B is the framework of a projecting apron, connected to the other part of the fender by a slotted hinge.

B' is a wire-netting covering the framework B on the apron. $b\ b\ b$ are coiled-wire springs between the netting B' and framework B. The general construction of this apron is the same as that part of the fender that fits against the front of the car.

C are four slotted arms bolted to or otherwise secured on the under rear part of the apron of the fender.

C' are four arms bolted to the forward part of the fender that fits against the front of the car.

$c\ c$ are pins rigidly secured in the arms C and forming the pivots for the slotted arms C.

$B^2$ is a soft-rubber toe or extension formed on the front end of the apron and extending clear across.

$b'$ is a steel plate supporting the soft-gum toe and protecting the under side thereof.

D are wheels running on the car-track and supporting and carrying the apron of the fender.

$d$ is the axle upon which the wheels D revolve. This axle extends all the way across the fender, under the apron.

$d'$ are supports for the axle. These supports are connected to the under part of the framework B.

The apron part of the fender is adjusted or balanced on the wheels D, so that it will, unless meeting some obstruction, ride in the position shown in Figs. 1 and 2.

If desired, instead of attaching the fender to the front of the car it may be secured underneath the car, just forward of the front wheels. (See Fig. 1.)

The fender being constructed and secured upon the front of the car, as shown, the forward part or toe $B^2$ of the apron will be about one and a half or two inches from the ground. Consequently any object lying upon or between the tracks will be struck first by the rubber toe $B^2$ on the apron of the fender. If the obstruction is a fixed and stationary object, such as a projecting paving-stone, the front of the apron will be raised upwardly, turning on the pins $c\ c$ in the arms C' in the direction indicated by arrow 1, thus allowing the fender to pass over the obstruction. Should the obstruction be a movable body, such as a child or grown person, the toe $B^2$, upon striking said obstruction, will be depressed in the direction indicated by arrow 2 and the rear portion of the apron will move upwardly in the direction indicated by arrow 3. Consequently as the car moves forward the said obstruction will be shoved along ahead of the fender, or if the car is going at a rapid rate of speed it will throw the person or other obstruction over upon the apron, where it will be carried until the car is stopped. The soft-rubber toe $B^2$, on the forward part of the apron will lessen the force of the blow when striking anything, and will also have a tendency to cling to the clothing of persons struck, and thus aid in preventing them from passing under the fender. It will also conform to any unevenness or irregularity in the pavement when the toe is forced downward by striking against an obstruction, such as a child.

When not in use, the apron part of the fender may be turned back in the direction indicated by arrow 4 and rest in the position shown by the dotted lines in Fig. 1.

Having thus described our invention, what we claim as new is—

1. A fender for street cars composed of two parts hinged together by loose slotted hinges, one of said parts being attached to the car and other part or striking portion of the fender, mounted on suitable supporting wheels that run at all times on the car tracks, substantially as shown and described.

2. A street car fender consisting of two parts, one of said parts being secured to the front of the car, and the other part or apron mounted upon suitable supporting wheels, the said parts being connected by a slotted hinge joint, the slot therein being vertical, whereby the said apron will oscillate on the wheels as a fulcrum and permit the depression of the front end of the apron when an object is struck, as set forth.

3. A fender for street cars consisting of the apron B mounted upon suitable supporting wheels that run on the car track, said apron being fastened to the car by means of a slotted hinge joint, the slot in said hinge being the arc of a circle the center of which is the center of the shaft that carries the apron supporting wheels, substantially as and for the purpose set forth.

In testimony whereof we affix our signatures in presence of two witnesses.

PETER R. FOLEY.
MICHAEL F. X. FOLEY.

Witnesses:
SAML. H. KIRKPATRICK,
THOS. D. MOWLDS.